United States Patent [19]

Dobhan et al.

[11] Patent Number: 4,795,280
[45] Date of Patent: Jan. 3, 1989

[54] LOCKING MECHANISM

[75] Inventors: Herbert Dobhan, Bergrheinfeld; Bruno Schemmel, Geldersheim; Hilmar Leuner, Ochtelhausen; Walter Hahn, Schonungen, all of Fed. Rep. of Germany

[73] Assignee: SKF GmbH, Schweinfurt, Fed. Rep. of Germany

[21] Appl. No.: 14,806

[22] Filed: Feb. 13, 1987

[30] Foreign Application Priority Data

Feb. 22, 1986 [DE] Fed. Rep. of Germany ... 8604837[U]

[51] Int. Cl.⁴ .................... F16C 35/06; F16C 43/00; F16D 1/06; A44B 21/00
[52] U.S. Cl. ...................... 384/539; 24/543; 384/428; 384/585; 403/290
[58] Field of Search .......... 384/510, 535–539, 384/559, 569, 581–585, 296, 295, 215, 217, 220, 275, 428, 435, 438, 439, 441; 403/289, 290, 365; 24/543

[56] References Cited

U.S. PATENT DOCUMENTS

| 3,481,655 | 12/1969 | Campbell | 384/536 |
| 3,565,470 | 2/1971 | Nicol et al. | 403/290 |
| 3,565,499 | 2/1971 | Fisher | 384/439 |
| 4,527,913 | 7/1985 | Seifert | 384/215 |

FOREIGN PATENT DOCUMENTS

| 217794 | 10/1961 | Austria | 384/535 |
| 3214232 | 10/1983 | Fed. Rep. of Germany . | |
| 1446907 | 6/1966 | France | 384/585 |
| 294667 | 7/1928 | United Kingdom | 384/537 |

Primary Examiner—Stuart S. Levy
Assistant Examiner—Thomas R. Hannon
Attorney, Agent, or Firm—Eugene E. Renz, Jr.

[57] ABSTRACT

A locking mechanism for connecting machine parts such as bearing rings on a support. The support includes at least one radially elastic element having a seating surface for the ring which is deflectable radially inwardly to permit assembly of the ring on the support surface and at least one locking element formed integrally with the support and acuatable between a release position wherein the snapping element can be flexed to facilitate assembly and removal of a ring on the seating surface and a locked position wherein the ring is supported in a form locking manner in the seating surface.

7 Claims, 3 Drawing Sheets

LOCKING MECHANISM

FIELD OF THE INVENTION

A present invention relates to locking mechanisms and has particular application to mechanisms or devices for so-called form locking connection of machine parts.

BACKGROUND OF THE INVENTION

A locking mechanism of the type to which the present invention relates is shown in West German Offenlegungsschrift No. 3,214,232. This patent shows a roller bearing having a support designed as a sleeve in the area of the seating surface. The sleeve has a number of axially-directed snapping elements distributed about its circumference, which are elastic in the radial direction. The snapping elements grip the roller bearing by the lateral surface of the inner ring to form a locking connection between the support and the roller bearing. The snapping elements have a generally conical contact ramp to facilitate insertion into the bore of the roller bearing. The snapping elements are locked in their effective position by insertion of a cup-shaped sheet metal element. Even though this known type of connection means fastens the roller bearing reliably on all sides, and its cup-shaped sheet metal element prevents spring-back of the snapping elements even under the effects of considerable forces, the connecting assembly has the disadvantage and draw back in that the sheet metal element must be produced separately and this considerably increases the expense of this type of connecting assembly.

SUMMARY OF THE INVENTION

With the foregoing in mind, it is an object of the present invention to provide a locking mechanism of the general type described above, which consists of relatively few parts which are easy and economical to manufacture and easy to assemble. To this end, in accordance with the present invention, the locking elements are formed on the support member in the region of the snapping elements and support them in a form locking manner. By reason of this unitary one piece design, the separate locking element normally required is no longer needed. In accordance with the present invention, the snapping elements are fixed in a predetermined position where they can perform their function by the integral locking elements. The locking mechanism of the present invention is particularly adapted for form locking connection of machine parts particularly an annular member such as a bearing ring member mounted on a support and comprises radially elastic snapping elements formed on the support which grip behind the ring by contacting generally radial surfaces of the ring member, wherein the locking elements are formed on the support adjacent to snapping elements in such a way as to support these elements in a form locking manner. By this arrangement, the locking elements spread out when shifted, bent, pivoted, or the like and assume a working position wherein they support the snapping elements preferably one against the other, and prevent them from springing back out of their effective locking position.

The locking mechanism of the present invention is easy and economical to manufacture. For example, the support according to the present invention is very easy to produce out of plastic by conventional injection-molding process. The locking elements can be formed at various points on the support itself or even on the snapping elements provided on the support. The only designed criteria or requirement is that they be free to move out of a non-contact in position, wherein the snapping elements are free to move within the range of their elasticity, into the locking position described above, wherein they hold the snapping elements in place. The unitary one-piece design of the present invention offers particular advantages in terms of production, inventory control and finally assembly.

In accordance with another more specific feature of the present invention, the snapping elements and the locking elements are formed on a generally common end surface of the support and are designed as radially elastic tongues. For example, there can be one locking element for each snapping element; and the locking element that can be brought by reason of its radial elasticity into a position which supports the snapping element radially. Moreover, the rest position from which the locking elements are moved against their intrinsic elasticity, can also be alternatively the effective locking position. In this instance both the snapping elements and the locking elements are formed on a common end surface of the support. For larger and heavier applications of the locking mechanism of the present invention, predetermined bending points such as film hinges or the like can be provided at an appropriate location. This is particularly applicable to the locking elements.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
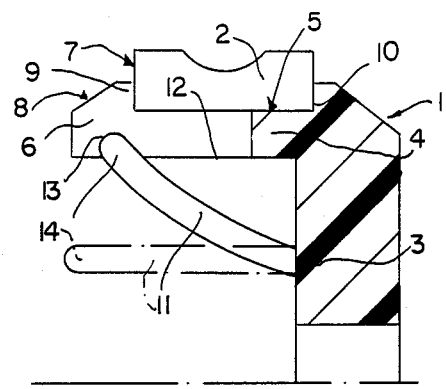
FIG. 1 is a fragmentary longitudinal section through a support for a ball bearing with snapping elements distributed about the periphery thereof and with the locking elements which fix the snapping elements in place individually.

Referring now to the drawings and particularly to FIG. 1 thereof, there is shown the inner ring 2 of a ball bearing mounted on a support 1. The support 1 is preferably made of plastic and is of generally cup-like form having a bottom 3 and an elongated sleeve shaped section 4, the outer peripheral surface of which defines a seating surface 5 for the bearing ring 2. As illustrated, the sleeve shaped section 4 supports the inner ring 2 in a continuous manner over about onethird of the width of the inner ring 2. Outboard of the continuous portion of the sleeve shaped section 4, it is provided with a series of axially extending slots 4a to form a plurality of radially elastic snapping elements 6 which are circumferentially spaced in a peripheral array. As illustrated, the snapping elements 6 engage the outer axial end face 7 of the ring 2 to produce a form locking support or connection against this surface. In the present instance, the outer terminal ends of the snapping elements are beveled to define a contact ramp 8 and thereby facilitate insertion of the inner ring 2 to the seated position shown. Accordingly, during assembly of the elements where the inner ring 2 is inserted over the snapping elements, the snapping elements 6 are displaced elastically radially inwardly, so that the inner ring 2 can be pulled over the locking flange 9 until it rests against an oppositely confronting shoulder 10 of support 1. The space between the flange 9 and shoulder 10 is slightly greater than the axial width of the ring 2, so that when the ring is moved into this position, snapping elements 6 spring back to their initial position and form an axial and radial form locking connection for inner ring 2. For each of these snapping elements 6, there is a separate locking element 11 formed on the bottom 3 of support member 1 which as indicated by the dotted lines in FIG. 1 extends in the axial direction when in the relaxed or rest position. Recesses 13 are provided on the inner boundary surface 12 of snapping elements 6 to receive the free end 14 of the locking elements therein. This is possible since they can be bent within their range of elasticity. The locked position is shown in solid lines in FIG. 1. This way, snapping elements 6 are prevented from springing back and when it is desired to disassemble the ring 2, the locking elements can simply be released by snapping the terminal end out of the recess 13.

Figure 2:
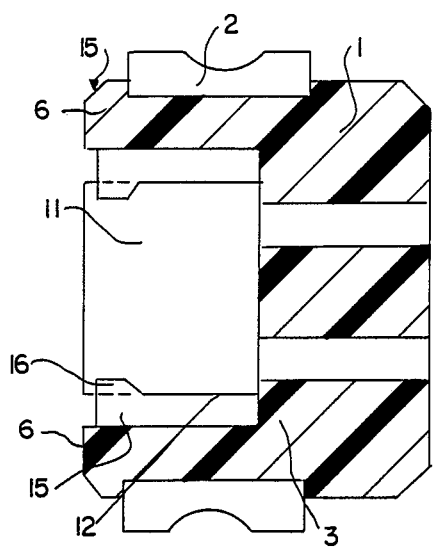
FIG. 2 is a longitudinal section through a support for a ball bearing with two opposing snapping elements and the locking elements which brace the snapping elements against each other.
Figure 1A:
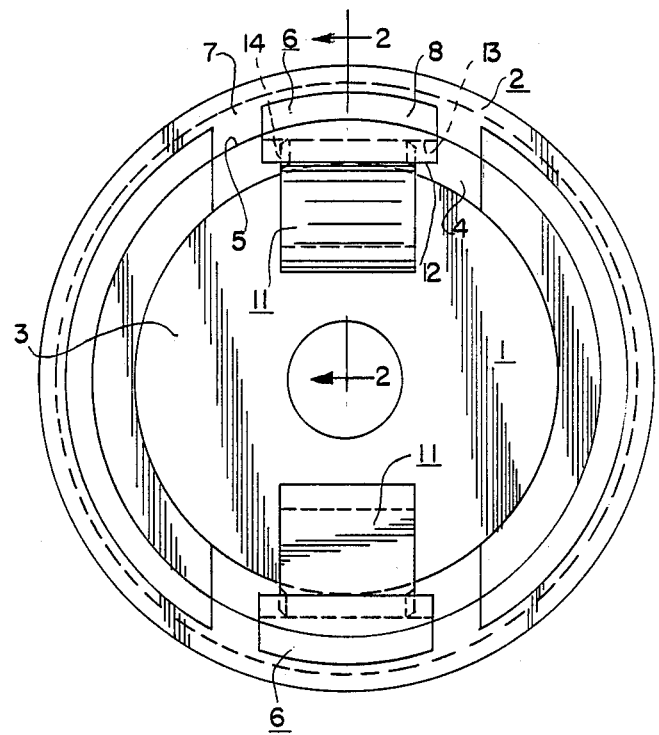
FIG. 1a is a front elevational view of a ball bearing assembly in accordance with the present invention.
Figure 3:
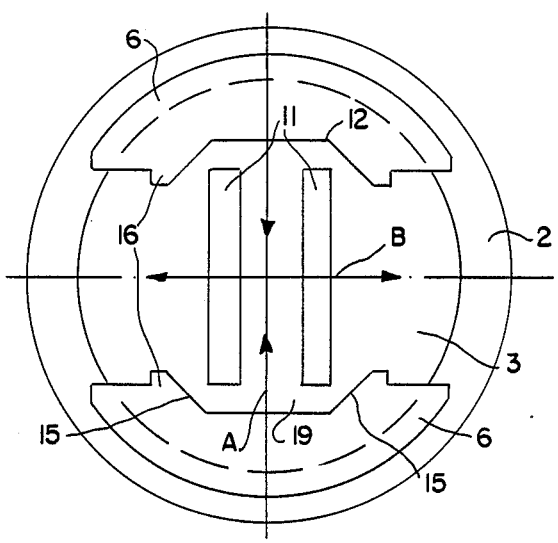
FIG. 3 is a side elevational view of the support element shown in FIG. 2 with the snapping and locking elements in the rest position.
Figure 4:
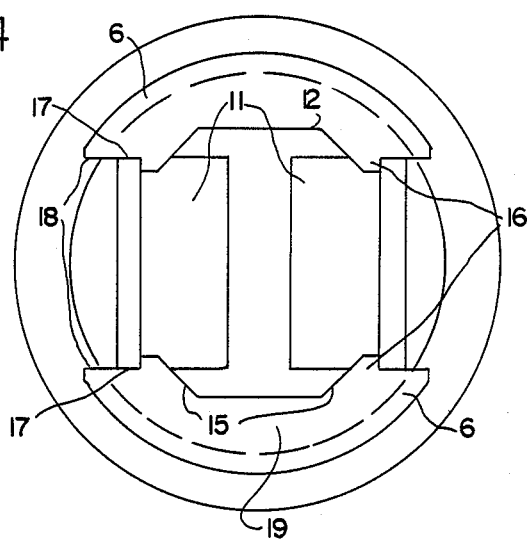
FIG. 4 is a side elevational view similar to FIG. 3 but with the locking elements engaged.

FIGS. 2, 3 and 4 show a modified form of locking mechanism in accordance with the present invention. In the embodiments illustrated, there are only two diametrically opposed snapping elements 6. These snapping elements are of a half moon shaped cross section and extend as illustrated in FIG. 3 in a circumferential direction a predetermined arc so that they occupy somewhat more than onequarter of a circle. Note, however, that the corner to corner dimension D of the snapping elements is less than the bore diameter D1 of the inner ring 2. As in the previously described embodiment, the snapping elements 6 have elasticity in the radial direction to allow displacement when the inner ring 2 is assembled in much the same manner as described above. FIG. 3 shows the position and phase of the parts just immediately after the inner ring has been positioned in place. This embodiment likewise has locking elements 11a which are formed on the bottom 3 of support 1. These locking elements are oriented in the direction of elasticity of snapping elements 6 as indicated by arrow A, so that they can be pivoted elastically in the direction perpendicular thereto as indicated by the arrow B from a rest position shown in FIG. 3 to the locking position shown in FIG. 4. As seen in FIG. 3, the locking elements extend in an axial direction when disposed in a rest position. In order to lock snapping elements 6, the locking elements 11 are moved in the direction of arrows B and in so doing, are bent radially outwardly and brought to the lock position shown in FIG. 4. As they are actuated in this direction, the outer edges of each locking element first traverse and slide along the angled contact ramps 15 on the retaining projections 16 formed on the inner boundary surfaces 12 thereof and then engage behind the shoulder formed by the projection 16 in a form locking manner. This engagement is promoted by the intrinsic elastic behavior of the material of all of the elements described. In the engaged locked position, the two locking elements 11 support snapping elements 6 against one another by way of the corresponding contact surfaces 17 and 18. Further as can best be seen from FIG. 2, retaining projections 16 are provided only in the outer axial region of snapping elements 6. Between the retaining projection 16, the snapping elements 6 have relatively deep recesses 19, to ensure that they can move elastically inward by a sufficient amount before making contact with locking elements 11 when they are in a rest position.

Even though particular embodiments of the invention have been illustrated and described herein, it is not intended to limit the invention and changes and modifications may be made therein within the scope of the following claims. The design and configuration of the locking elements in particular can be modified over a wide range. Furthermore, the form of the retaining projections for the locking elements can be modified to provide a friction locking or force locking connection.

What is claimed is:

1. A locking means for the form-locking connection of machine parts, such as a ring (2) on a support (1), at least one radially elastic snapping element (6) formed on the support (1), engageable behind the ring (2) by contact with essentially radial partial surface (7), and which can be positively form-locked in their effective position, and at least one locking element (11) formed on the support (1) adjacent the snapping elements (6) cooperable therewith to support these elements in a form-locking manner, said snapping element (6) and the locking element (11) being formed on an essentially common end surface (3) of the support (1) and designed as radially elastic tongues.

2. A locking means according to claim 1, characterized in that before locking elements (11) are moved into their locking position, they are located at rest in a radially inner position.

3. A locking means according to claim 1, characterized in that projections (16), which hold the locking elements (11) in their locking position, are provided on the boundary surfaces (12) of the snapping elements (6).

4. A locking assembly for mounting a machine part such as a bearing ring thereon comprising a support member (1), at least one element projecting axially from said support member and elastically displaceable in a radial direction, means defining a support surface for the ring to allow assembly and disassembly of the ring on said seating surface, and at least one locking element (11) formed integrally with said support member operable between a first position locking said radially elastic element in a position to support the machine part on said seating surface in a form locking manner and a release position disengaged from said radially elastic element to permit assembly or disassembly of the ring from said seating surface.

5. A locking mechanism as claimed in claim 4, wherein said elastic elements comprise a plurality of axially directed flexible circumferentially spaced fingers projecting from the outer peripheral surface of said other axial end face of said support member.

6. A locking assembly as claimed in claim 4, wherein said elastic elements comprise a pair of side by side members which are actuated radially outwardly with respect to one another and including snapping elements of generally half-moon shaped cross section having a corner dimension of a diameter less than the bore diameter of the inner ring and including angled contact ramps (15) on retaining projections formed on the inner boundary surface engageable by the elastic elements during acuation to a locked position so that the elastic elements ride up the angled ramps and lock behind the shoulders to maintain the half moon sections in the locked position.

7. A locking means for the form locking connection of machine parts, such as a ring (2) on a support (1) two diametrically opposite, radially elastic snapping elements (6), formed on the support (1) engageable behind the ring 2 by contact with essentially radial partial surface (7) and which can be positively form locked in their effective position, said elastic snapping elements extending over at least one-quarter of a circle, and two diametrically opposite locking elements (11), which are free to move in a direction perpendicular to the direction of the elasticity of the snapping elements, and in that these locking elements, when in their radially outermost locking position, are designed in such a way that their contact surfaces (17) brace snapping elements (6) against each other by means of the corresponding outer surface sections (18) of their radially inward-facing, diametrically opposing boundary surfaces (12).

* * * * *